United States Patent [19]

Nishiyama et al.

[11] Patent Number: 5,151,327

[45] Date of Patent: Sep. 29, 1992

[54] ADHESIVE SHEET FOR REINFORCING THIN RIGID PLATES

[75] Inventors: Yukio Nishiyama; Kazuo Shigeta, both of Osaka, Japan

[73] Assignee: Nitto Denko Corporation, Osaka, Japan

[21] Appl. No.: 493,641

[22] Filed: Mar. 15, 1990

[51] Int. Cl.5 ............................. B32B 7/12; B32B 3/26
[52] U.S. Cl. ................................... 428/343; 428/344; 428/273; 428/268; 428/319.1; 428/304.4; 428/317.9
[58] Field of Search ............... 428/343, 344, 273, 268, 428/319.1, 304.4, 317.9

[56] References Cited

U.S. PATENT DOCUMENTS

| | | | |
|---|---|---|---|
| 4,242,406 | 12/1980 | El Bouhnini et al. | 428/272 X |
| 4,374,890 | 2/1983 | Shimizu et al. | 428/349 X |
| 4,378,395 | 3/1983 | Asoshina et al. | 428/319.3 X |
| 4,397,914 | 8/1983 | Miura et al. | 428/319.3 X |
| 4,399,174 | 8/1983 | Tanaka et al. | 428/319.3 X |
| 4,451,518 | 5/1984 | Miura et al. | 428/189 X |
| 4,528,223 | 7/1985 | Kumazawa et al. | 428/272 X |
| 4,569,880 | 2/1986 | Nishiyama et al. | 428/188 X |
| 4,579,773 | 4/1986 | Cole et al. | 428/268 X |
| 4,803,105 | 2/1989 | Kretow et al. | 428/344 X |
| 4,944,127 | 7/1990 | Clear | 428/319.1 X |

FOREIGN PATENT DOCUMENTS

| | | |
|---|---|---|
| 5850661 | 5/1979 | Japan . |
| 6037837 | 4/1980 | Japan . |
| 1-221236 | 9/1988 | Japan . |

*Primary Examiner*—George F. Lesmes
*Assistant Examiner*—D. R. Zirker
*Attorney, Agent, or Firm*—Sughrue, Mion, Zinn, Macpeak & Seas

[57] ABSTRACT

An adhesive sheet for reinforcing thin rigid plates is disclosed, which comprises a thermosetting resin composition layer and a reinforcing substrate laminated or embedded therewith, the reinforcing substrate having undergone sizing treatment with a heat-resistant resin to have stiffness, and the thermosetting resin composition layer having tackiness at room temperature and comprising a thermosetting resin and a hardener.

13 Claims, 1 Drawing Sheet

ADHESIVE SHEET FOR REINFORCING THIN RIGID PLATES

FIELD OF THE INVENTION

The present invention relates to an adhesive sheet for use in the reinforcement and vibration damping of thin rigid plates such as thin steel plate parts for automobiles, etc.

BACKGROUND OF THE INVENTION

In automobiles and other vehicles, steel plates used in the bodies are reinforced by various means. For example, relatively large and flat but thin exterior plates such as those for roofs, fenders, hoods, trunks, quarter-panels and doors are reinforced by attaching metallic reinforcing parts to the inside of these exterior plates by means of spot welding and adhesive so as to impart proper stiffness to the plates, and thereby the plates withstand external forces.

The above method, however, is disadvantageous in that the great weights of the metallic reinforcing parts cause the exterior plates, which have been designed to have small thicknesses based on the trend toward weight reduction in vehicle bodies, to have increased weights after the reinforcement, and that the use of the metallic reinforcing parts heightens production costs and necessitates a complicated process for attaching the reinforcing parts. In addition, the plates reinforced by metallic reinforcing parts are apt to rust at the spot-welded areas, and a sufficient vibration-damping effect cannot be obtained by the reinforcement with the metallic reinforcing parts.

For the above reasons, reinforcement with resins is being adopted. The following two techniques have been proposed as methods for reinforcement with resins, as described, e.g., in U.S. Pat. No. 4,374,890, JP-A-57-89952, JP-A-1-221236, JP-A-U-59-139320, JP-B-58-50661 and JP-B-60-37837. (The term "JP-A" as used herein means an unexamined published Japanese patent application; the term "JP-B" as used herein means an examined Japanese patent publication; and the term "JP-A-U" as used herein means an unexamined published Japanese utility model application.)

The first method is to coat or adhere polymeric materials, such as asphalt rubbers, butyl rubbers, epoxy resins, phenolic resins, acrylic resins and unsaturated polyester resins, on the back surface of car body exterior plates.

The second method is to reinforce car body exterior plates by means of a laminate consisting of two resin layers.

The above laminate is a resinous reinforcing material composed of a first resin layer containing a reinforcing substrate incorporated therein so as to have a high reinforcing effect and a second resin layer which has a low stiffness and serves to prevent deformation of the steel plates.

The first resin layer in the above reinforcing material may contain a foaming agent which decomposes upon heating to produce foam, thereby giving a resinous reinforcing sheet which increases in thickness through heat cure and, hence, has a heightened reinforcing effect.

The above-described first method has advantages that if a resin material having a high tensile modulus and a high adhesion strength is selected as the polymeric material and applied at a large thickness, a considerable reinforcing effect is obtained, and that, in comparison to the reinforcement with metallic reinforcing materials, the weight of the reinforcing material is small and the reinforcing process is simple.

However, almost all the polymeric materials having high tensile moduli or high adhesion strengths are based on thermosetting resin compositions, and such polymeric materials contract through cure to have a residual stress which cause the thus-reinforced exterior plate to suffer from deformation (depressed areas), resulting in a vehicle body having poor flat-top characteristics that severely impair the commercial value of the final product. To avoid such a vital problem, resin compositions having relatively low moduli can only be used, so that a sufficient reinforcing effect cannot be attained.

The second method can attain, to some extent, both the reinforcement of steel plates and the prevention of plate deformation which are contradictory to each other. However, this method has the following disadvantages.

Although there is an advantage in the above-described second method that the stiffness of the cured resinous reinforcing sheet can be increased by increasing the thickness of the sheet because the stiffness is in proportion to the third power of the thickness, an increased resin amount results in an increase in car body weight and in production cost. Further, the resinous reinforcing sheets used in the second method generally employ glass cloths as their reinforcing substrates, and these glass cloths cause the following problems. Since general glass cloths are soft and the resin used for producing reinforcing sheets should also be soft because it is required to have tackiness, the resulting reinforcing adhesive sheets are so pliable that the application properties thereof in automobile-production lines are impaired. In particular, where a reinforcing adhesive sheet is used in summer (i.e., at relatively high temperature) or should be applied one-handed, the sheet is required to have a certain degree of stiffness. Hence, there is now a desire for a reinforcing adhesive sheet having moderate stiffness and improved application properties. Furthermore, because the reinforcing adhesive sheets used in the second method are so pliable, air is apt to be included between the sheets and the plates during application of the sheets and this may cause blisters in the sheets after heat cure. Moreover, when the reinforcing adhesive sheets are cut into predetermined shapes, the glass cloths fray and glass fibers are released therefrom, causing pollution of coatings.

A further problem of the second method is that although it has become possible to increase the thickness of the heat-cured reinforcing sheet without increasing the thickness of the uncured reinforcing sheet by the incorporation of a foaming agent in the first resin layer, foaming of the resin results in a decrease in the strength of the first resin layer, so that only a slight improvement in reinforcing property can actually be attained by increasing the thickness.

Still a further problem of the second method is that since the reinforcing adhesive sheet has a two-layer structure composed of the first and second resin layer, resins should be used in large quantities and the process for producing the sheet involves many steps, resulting in a low production efficiency and high production costs.

SUMMARY OF THE INVENTION

Accordingly, an object of the present invention is to provide an adhesive sheet for use in reinforcing thin rigid plates, which is advantageous in that it can be produced at a very high efficiency, it has a small weight but is excellent in reinforcing effect, it is free from the pollution of coatings by fibers released from frayed cloths at its edges, it causes no blisters therein after heat cure, and it has good application properties.

Other objects and effects of the present invention will be apparent from the following description.

The present invention relates to an adhesive sheet for reinforcing thin rigid plates comprising a thermosetting resin composition layer and a reinforcing substrate laminated or embedded therewith, the reinforcing substrate having undergone sizing treatment with a heat-resistant resin to have stiffness, and the thermosetting resin composition layer having tackiness at room temperature and comprising a thermo-setting resin and a hardener.

DETAILED DESCRIPTION OF THE INVENTION

Figure 1A:
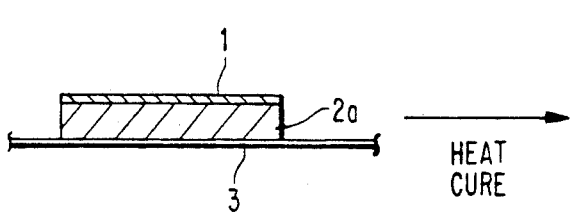
FIG. 1 shows cross-sectional views illustrating an application example for an adhesive sheet according to the present invention.

The thin rigid plates which are reinforced by the adhesive sheet of the present invention preferably have a thickness of from 0.3 to 2 mm. Examples thereof include thin metal plates, e.g., steel plates, aluminum plates, copper plates and stainless steel plates, and thin resin plates, e.g., FRP plates and ordinary resin plates. In the following description, the present invention is explained often by referring to an adhesive sheet for reinforcing a thin metal plate, e.g., steel plate, which is one embodiment of the present invention, but the present invention is not limited thereto.

The present inventors have conducted intensive studies to overcome the above-described prior art problems. As a result, the following have been found.

By subjecting a reinforcing substrate to sizing treatment with a heat-resistant resin such as a phenol or melamine resin to impart stiffness to the reinforcing substrate, the prior art problem that cutting of reinforcing adhesive sheets results in fraying of their reinforcing substrates can be overcome, so that the pollution of coatings by fibers released from frayed reinforcing substrates can be prevented. Further, due to the stiffness of the substrate, the resulting adhesive sheet also has moderate stiffness. As a result, the adhesive sheet has improved application properties, so that it can be applied one-handed and the blister problem caused by air included between the adhesive sheets and the thin rigid plates during application of the sheets is eliminated. The sizing treatment also has the effect of heightening the strength of the reinforcing substrate, leading to improved reinforcing properties of the adhesive sheet after cure.

Furthermore, a reinforcing adhesive sheet comprising a combination of a size-treated reinforcing substrate and a room-temperature-tacky thermosetting resin composition layer comprising, as essential components, a thermosetting resin and a hardener therefor or preferably comprising a thermo-setting resin, a hardener therefor, a foaming agent that decomposes upon heating to produce foam, short fibers and a thixotropic agent was surprisingly found to have the following advantages.

The above adhesive sheet produces a sufficient reinforcing effect, even though the thermosetting resin composition layer is of a single-layer structure as different from the conventional two-layer structure comprising a first and second resin composition layers. That is, the resin layer after heat cure can have an increased thickness due to resin foaming, without increasing the thickness of the resin layer in the uncured state, and the strength of the resin is prevented from decreasing through curing and foaming by the presence of short fibers.

Due to the sizing treatment of the reinforcing substrate with a heat-resistant resin, the reinforcing substrate is prevented from fraying when the adhesive sheet is cut, so that the pollution of coatings by fibers released from frayed reinforcing substrates can be prevented. Further, the stiffness of the reinforcing substrate imparts proper stiffness to the adhesive sheet, so that the application properties of the sheet is improved and blisters resulting from the inclusion of air between adhesive sheets and thin rigid plates are eliminated.

Furthermore, by laminating a thermosetting resin composition containing a foaming agent, short fibers and a thixotropic agent to the reinforcing substrate to provide a reinforcing adhesive sheet, the resin can be made to have almost the same coefficient of thermal expansion as that of thin metal plate, e.g., steel plates, as thin rigid plates. As a result, reinforcement and the prevention of exterior plate deformation, which are contradictory to each other, can be attained without employing the conventional two-resin-layer structure.

The present invention is described below in more detail.

In the adhesive sheet for reinforcing thin plates according to the present invention, it is particularly preferable that the thermosetting resin composition layer further comprises a foaming agent that decomposes upon heating to produce foam, short fibers and a thixotropic agent.

The reinforcing substrate is not particularly limited as long as it serves to improve the strength of the thermosetting resin composition layer after it is united with the thermosetting resin composition layer which is described later. Examples of the reinforcing substrate include organic or inorganic woven fabrics, unwoven fabrics, knitted webs, and cloths. Of these, glass cloth is most preferred which significantly enhances the strength of the thermosetting resin composition layer. The thickness of the reinforcing substrate is generally from about 5 to 500 μm, and preferably from 50 to 200 μm.

The most characteristic feature of the present invention is that the reinforcing substrate in the adhesive sheet has undergone sizing treatment with a heat-resistant resin. Preferred examples of the heat-resistant resin used for the sizing treatment include curable resins such as phenol, epoxy, melamine, urea and acrylic resins, and melamine and urea resins are more preferred. The amount of the heat-resistant resin applied in the sizing treatment to the reinforcing substrate is preferably in the range of from 2 to 20% by weight, more preferably from 4 to 10% by weight, based on the amount of the reinforcing substrate before the treatment. If the amount of the heat-resistant resin applied is below 2% by weight, the sizing effect is insufficient, while an amount thereof exceeding 20% by weight is not preferred in that the resulting adhesive sheet has immoderate stiffness to show poor handling properties and impaired application properties to thin rigid plates.

The sizing treatment can be carried out by conventional methods, e.g., glass cloth is impregnated with a heat-resistant resin solution followed by being heat-treated. In the sizing treatment, the heat-resistant resin may be used after being mixed with a hardener and, if necessary, a curing accelerator. Therefore, the heat-resistant resin applied has preferably been cured when the sizing treatment is completed.

Examples of the thermosetting resin used in the thermosetting resin composition layer include various kinds of epoxy resins, such as glycidyl ether type, glycidyl ester type, glycidylamine type, linear-aliphatic epoxide type and alicyclic epoxide type, and modified epoxy resins derived therefrom. These are preferred in that they show good adhesion to metal plates.

In addition to the above thermosetting resins other resins such as a melamine resin, a polyester resin, phenolic resin and a urea resin may be used.

In the adhesive sheet for reinforcing a thin rigid plate according to the present invention, the thermosetting resin composition is present in the uncured state, and, after the adhesive sheet is attached to the adherend thin rigid plate, it is heated to cure the resin composition.

A hardener which is activated by heat is generally incorporated in the above thermosetting resin. As the hardener, an ordinarily employed hardener which exerts a catalytic action upon heating may satisfactorily be used if it is activated at a temperature generally in the range of from 80° to 200° C. Specific examples of the hardener for epoxy resins or modified epoxy resins include dicyandiamide, 4,4'-diaminodiphenylsulfone, phenol, various acids or acid anhydrides and polyamide amines, and dicyandiamide is preferably used. Examples of the curing accelerator, which may be used with the hardener for the epoxy resins or the modified epoxy resins include imidazole derivatives such as 2-n-heptadecylimidazole, isophthalic acid dihydrazide, adipic acid dihydrazide, guanidine compounds and N,N-dialkylthiourea derivatives.

The amount of the hardener is generally from 3 to 30 parts by weight and that of the curing accelerator is generally 10 parts by weight or less, per 100 parts by weight of the epoxy resin and the modified epoxy resins, but the amounts thereof depend on the kinds thereof.

Into the thermosetting resin composition obtained by mixing the above-described ingredients, various additives may incorporated for various purposes such as imparting cohesive power to the thermosetting resin composition to such an extent that the composition can be formed into sheets, and reducing the viscosity of the composition to improve the wetting properties thereof.

For example, in order to improve the ability to be formed into sheets, there may be incorporated a thermoplastic resin, such as poly(vinyl butyral), a polyamide, a polyamide derivative, a polyester, a polysulfone, a polyketone, a high molecular weight epoxy resin derived from bisphenol A and epichlorohydrin, or a liquid synthetic rubber, such as isoprene rubber, a butadiene-acrylonitrile copolymer, or a derivative of the copolymer. The amount of the thermoplastic resin used is preferably from about 5 to 100 parts by weight per 100 parts by weight of the thermosetting resin.

For the purpose of reducing the viscosity of the thermosetting resin composition to improve its wetting properties, a reactive diluent, such as butyl glycidyl ether or a long-chain alcohol monoglycidyl ether, or a phthalic acid-based plasticizer, such as dioctyl phthalate, may be incorporated into the composition. The amount of such additive is preferably from about 3 to 30 parts by weight per 100 parts by weight of the thermosetting resin.

Various fillers such as calcium carbonate, talc, silica, alumina, and titanium oxide may further be incorporated in the above-described thermosetting resin composition.

The filler is incorporated in such an amount that the adhesion between the plate and the adhesive sheet after heat cure is not impaired when this adhesive sheet is used to reinforce an exterior door plate or the like. In general, such an amount is 150 parts by weight or less per 100 parts by weight of the resin component in the thermosetting resin composition.

In the adhesive sheet of this invention for reinforcing thin rigid plates, it is particularly preferred that the thermosetting resin composition layer further comprises a foaming agent that decomposes upon heating to produce foam, short fibers and a thixotropic agent.

Examples of the foaming agent that decomposes upon heating to produce foam include azo-compounds such as azodicarbonamide and azobisisobutyronitrile, nitroso compounds such as dinitrosopentamethylenetetramine, and hydrazide compounds such as p-toluenesulfonyl hydrazide and 4,4'-oxybenzenesulfonyl hydrazide, and hydrazide compounds are preferably used. These foaming agents may be used alone or in combination of two or more thereof. Preferred of those are foaming agents having decomposition temperatures of 100° C. or more, from the standpoint of the shelf life or stability of the resulting adhesive sheet for reinforcing thin rigid plates.

Those foaming agents may be used in combination with a foaming auxiliary if desired and necessary. Examples of the foaming auxiliary include inorganic compounds such as zinc flower, metallic soaps such as zinc stearate, and urea compounds.

The amount of the above-described foaming agent incorporated is generally from 0.5 to 10 parts by weight, preferably from 3 to 7 parts by weight, per 100 parts by weight of the resin component in the thermosetting resin composition. If the amount of the foaming agent incorporated is below 0.5 part by weight, a sufficient reinforcing effect cannot be brought about by foaming. An amount thereof exceeding 10 parts by weight is also not preferable in that the resin undergoes severe foaming, so that the reinforcing effect is impaired, far from heightened.

The amount of the above-described foaming auxiliary incorporated is generally from 0.2 to 7 parts by weight per 100 parts by weight of the resin component in the thermo-setting composition. If the amount of the foaming auxiliary incorporated is below 0.2 part by weight, it cannot produce a sufficient effect. If the amount thereof is larger than 7 parts by weight, the reinforcing effect is impaired.

In the present invention, for the purpose of preventing the thermosetting resin composition layer from having a reduced resin strength after heat cure due to the foaming of the resin, short fibers may be incorporated. Examples of the short fibers include inorganic short fibers made of, for example, glass, organic short fibers made of, for example, vinylon or nylon, and metallic short fibers made of, for example, silver or stainless steel. Among these, glass short fibers are preferably used.

As the short fibers, those having aspect ratios (length-/diameter ratios) of from 5 to 350, more preferably from 10 to 200, and diameters of from 1 to 30 μm, more preferably from 6 to 13 μm, are preferably employed, because such short fibers have good dispersibility and serve not only to suppress a decrease in resin strength due to heat foaming but to improve the resin strength. If the aspect ratios of the short fibers are below 5, a decrease in resin strength after heat cure cannot be suppressed, while short fibers having aspect ratios higher than 350 have poor dispersion in the thermosetting resin composition layer.

The amount of the above short fibers used is generally from 10 to 100 parts by weight, preferably from 20 to 70 parts by weight, per 100 parts by weight of the resin component in the thermosetting resin composition. If the incorporated amount thereof is below 10 parts by weight, the decrease in resin strength cannot be suppressed. If the amount thereof exceeds 100 parts by weight, it becomes difficult to uniformly disperse the short fibers in the thermosetting resin composition layer.

By the incorporation of the short fibers having aspect ratios of 5 to 350 and diameters of 1 to 30 μm in the thermosetting resin composition layer in an amount of 10 to 100 parts by weight per 100 parts by weight of the resin component, the decrease in resin strength due to foaming can be suppressed and improved reinforcing properties can be attained, without increasing the amount of the thermosetting resin composition containing a foaming agent or without increasing the thickness of the thermosetting resin composition layer.

Further, by incorporating a thixotropic agent into the thermosetting resin composition, finely and uniformly dispersed foaming cells are attained so that a uniform resin strength and resin thickness after foaming can be obtained.

When the adhesive sheet for reinforcing thin rigid plates according to the present invention is applied, for example, on perpendicular parts or on the lower sides of parts, the adhesive sheet is stuck perpendicularly or upside down. For such applications, flow of the resin being cured should be suppressed so as to prevent the reinforcing adhesive sheet from shifting or falling. For this purpose, incorporation of a thixotropic agent is preferred.

Examples of the thixotropic agent include silica, asbestos fibers and organobentonite. Of these, organobentonite is most effective.

The amount of such thixotropic agent incorporated is preferably from 3 to 30 parts by weight, more preferably from 5 to 20 parts by weight, per 100 parts by weight of the resin component in the thermosetting resin composition. If the amount thereof is less than 3 parts by weight, improvement in resin forming is not sufficient, and the thixotropic properties of the resulting thermosetting resin composition are so poor that the adhesive sheet produced therefrom shifts or falls during cure of the resin. If the amount thereof exceeds 30 parts by weight, initial tackiness is impaired and uniform dispersion of the thixotropic agent into the resin becomes difficult.

In particular, organobentonite is most preferably employed as a thixotropic agent in the thermosetting resin composition because the resulting composition provides a cured resin in an extremely good foamed state and because the resin composition possesses excellent thixotropic properties, so that shifting or falling of the resulting adhesive sheet during cure of the resin can be surely prevented. The incorporated amount of the organobentonite, if used, is preferably from 3 to 30 parts by weight per 100 parts by weight of the resin component in the thermosetting resin composition, for the reasons given above.

As described hereinabove, the use of the thermosetting resin composition comprising a thermosetting resin, a hardener therefor, a foaming agent, short fibers and a thixotropic agent is particularly effective in preventing the deformation of thin metal plates, e.g., steel plates, as an adherend.

In general, where a reinforcing adhesive sheet is applied on an adherend thin metal plate, e.g., steel plate, and then cured to reinforce the plate, the thin metal plate suffers from deformation due to a contraction stress caused by the difference in coefficient of thermal expansion between the adhesive sheet and the metal plate. However, this deformation can be diminished by use of the adhesive sheet in which its thermosetting resin composition layer contains a foaming agent, short fibers and a thixotropic agent.

That is, after curing and resin foaming, the thermosetting resin composition layer containing a foaming agent, short fibers and a thixotropic agent has a low coefficient of thermal expansion and also a low modulus of elasticity, as compared with unfoamed but cured resin layers. As a result, the cured and foamed resin composition layer has a reduced contraction stress, which advantageously does not cause the adherend thin metal plate, e.g., steel plate, to deform.

A particularly preferred embodiment of the adhesive sheet of the present invention for use in reinforcing thin plates is that its thermosetting resin composition layer comprises 0.5 to 10 parts by weight, per 100 parts by weight of the resin component of the thermosetting resin composition layer, of a foaming agent that decomposes to produce foam at a temperature of 100° C. or higher and 3 to 30 parts by weight, per 100 parts by weight of the resin component of the thermosetting resin composition layer, of organobentonite as a thixotropic agent. Such adhesive sheet has most enhanced reinforcing properties, can be produced at a high efficiency, and shows extremely good application properties to adherends.

When the adhesive sheet for reinforcing thin rigid plates according to the present invention is applied on perpendicular parts of adherends or on the lower sides of adherends, the thermosetting resin composition layer constituting the adhesive sheet is required to have such a tack strength that the adhesive sheet applied on an adherend does not shift or fall until its cure by heating is completed.

The method for producing the adhesive sheet of the present invention is not particularly limited and may be any conventional methods, e.g., the resin composition layer is formed by using straight pressing, various coaters, extrusion molding, etc. and then the reinforcing substrate is laminated or embedded therewith.

In the case where the adhesive sheet of the present invention contains a foaming agent, the dynamic elastic modulus of the adhesive sheet after heat cure and foaming is generally from $1 \times 10^8$ to $1 \times 10^{10}$ dyne/cm$^2$, preferably from $5 \times 10^8$ to $3 \times 10^{10}$ dyne/cm$^2$, and more preferably from $8 \times 10^8$ to $5 \times 10^9$ dyne/cm$^2$.

Figure 1B:
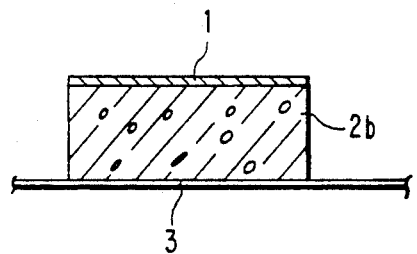

An application example for the adhesive sheet of the present invention is shown in FIG. 1. FIG. 1(a) shows the schematic cross-sectional view of the adhesive sheet of the present invention immediately after applying to the adherend thin steel plate 3 before heat cure. 1 denotes the size-treated reinforcing substrate and 2a denotes the thermo-setting resin composition layer before heat cure. FIG. 1(b) shows the schematic cross-sectional view of the adhesive sheet of the present invention after heat curing. 2b denotes the thermosetting resin composition layer after heat cure and foaming.

In the adhesive sheet for reinforcing thin rigid plates such as thin steel plates of the present invention having the constitution described above, the reinforcing substrate that has been united with the thermosetting resin composition layer has stiffness and good cutting properties because the substrate has undergone sizing treatment with a heat-resistant resin. Due to such reinforcing substrate, the adhesive sheet has improved stiffness, which improves the application properties thereof in automobile-production lines and eliminates the blister problem caused by air included between adhesive sheets and adherends when the sheets are applied. Moreover, the reinforcing substrate is prevented from fraying when the adhesive sheet is cut, so that the pollution of coatings by fibers released from frayed reinforcing substrates can be prevented.

In the case where the thermosetting resin composition layer in the adhesive sheet for reinforcing thin rigid plates of the present invention contains a foaming agent, short fibers and a thixotropic agent, there is no need for the resin composition layer to have a two-layer structure consisting of different kinds of resin layers such as the conventional first and second resin layers. As a result, both the amount of the resin used to produce the adhesive sheet and the thickness of the resin layer can be reduced, and further, the adhesive sheet gives, through heat-foaming of the resin, a lightweight reinforcing material having a high reinforcing effect.

The heat-foaming of the resin greatly reduces the thermal expansion coefficient and elasticity modulus of the resin layer, so that the cured resin layer has a very weak heat contraction stress. For this reason, adherend thin metal plates, e.g., steel plates, can be effectively reinforced without suffering from deformation. Furthermore, because of the incorporation of a thixotropic agent, foaming of the resin results in fine foam cells uniformly dispersed in the resin layer. Even when the adhesive sheet is applied on a perpendicular part of an adherend or on the lower side of an adherend upside down and then cured, shifting or falling of the adhesive sheet does not take place. Thus, the adhesive sheet has improved application properties.

The present invention will be explained below in more detail by reference to the following Examples, which should not be construed to be limiting the scope of the invention.

EXAMPLE 1

Into a mixing pot were introduced 45 parts by weight of Epikote #871 (dimer acid-modified epoxy resin manufactured by Yuka Shell K.K., Japan), 40 parts by weight of Epikote #1002 (bisphenol A epoxy resin manufactured by Yuka Shell K K.), and 15 parts by weight of a liquid isoprene rubber (Kraprene LIR manufactured by Kuraray Co., Ltd.), and the resulting mixture was homogenized. To 100 parts by weight of the resulting composition were added 0.6 part by weight of an imidazole type hardener (Curezole $C_{11}Z$), 5 parts by weight of dicyandiamide, 50 parts by weight of talc, 15 parts by weight of organobentonite as a thixotropic agent, 3 parts by weight of Neocellborn P#1000 (hydrazide-type foaming agent), and 35 parts by weight of glass short fibers (diameter 10 μm, aspect ratio 30). The resulting mixture was kneaded with conventional mixing rolls, and the thus-obtained resin composition was formed with a hot press into a sheet having a thickness of 1.0 mm.

To the surface of the above-obtained sheet, a glass cloth which had undergone sizing treatment with a melamine resin (glass cloth weight, 220 g/m$^2$; sizing agent (heat-resistant resin) amount, 20 g/m$^2$) was laminated as a reinforcing substrate. Thus, a 1.2 mm-thick adhesive sheet of this invention for use in reinforcing thin steel plates was obtained.

EXAMPLES 2 TO 6

Adhesive sheets for reinforcing thin plates were obtained in the same manner as in Example 1 except that the formulation for each resin composition and the sizing agents were as shown in Table 1.

COMPARATIVE EXAMPLES 1 AND 2

Comparative adhesive sheets for reinforcing thin plates were obtained in the same manner as in Example 1 except that the formulation for each resin composition and the sizing agents as shown in Table 1. The thickness of the adhesive sheet of Comparative Example 2 was 2.5 mm.

In Table 1, the amounts of the components are shown in terms of part by weight.

The adhesive sheets obtained in the above Examples and Comparative Examples were evaluated for various properties according to the methods described below. The results obtained are summarized in Table 2.

TABLE 1

| Formulation for Resin Composition | Example | | | | | | Comparative Example | |
| --- | --- | --- | --- | --- | --- | --- | --- | --- |
| | 1 | 2 | 3 | 4 | 5 | 6 | 1 | 2 |
| Dimer acid-modified epoxy resin (epoxy equivalent 400) | 45 | 45 | 45 | 45 | 45 | 45 | 45 | 45 |
| Bisphenol A epoxy resin (epoxy equivalent 700) | 40 | 40 | 40 | 40 | 40 | 40 | 40 | 40 |
| Liquid isoprene rubber | 15 | 15 | 15 | 15 | 15 | 15 | 15 | 15 |
| Imidazole type hardener | 0.6 | 0.6 | 0.6 | 0.6 | 0.6 | 0.6 | 0.6 | 0.6 |
| Dicyandiamide | 5 | 5 | 5 | 5 | 5 | 5 | 5 | 5 |
| Talc | 50 | 50 | 50 | 50 | 50 | 50 | 50 | 50 |
| Organobentonite | 15 | 15 | 6 | 25 | 10 | 15 | 4 | 15 |
| Foaming agent | 3 | 0.5 | 3 | 2 | 8 | 3 | 3 | — |
| Glass short fiber (I) | 35 | 30 | — | 20 | — | 5 | 35 | 35 |
| Glass short fiber (II) | — | — | 90 | — | 40 | — | — | — |

Glass short fiber (I): diameter 10 μm, aspect ratio 30
Glass short fiber (II): diameter 3 μm, aspect ratio 300

TABLE 1-continued

| Formulation for Resin Composition | Example | | | | | | Comparative Example | |
|---|---|---|---|---|---|---|---|---|
| | 1 | 2 | 3 | 4 | 5 | 6 | 1 | 2 |
| Reinforcing substrate | | | | | | | | |
| Examples 1-3: galss cloth size-treated with melamine resin | | | | | | | | |
| Example 4-5: galss cloth size-treated with phenol resin | | | | | | | | |
| Comparative Example 1-2: glass cloth (no sizing treatment) | | | | | | | | |

TABLE 2

| | Example | | | | | | Comparative Example | |
|---|---|---|---|---|---|---|---|---|
| | 1 | 2 | 3 | 4 | 5 | 6 | 1 | 2 |
| Uncured adhesive sheet thickness (mm) | 1.2 | 1.2 | 1.2 | 1.2 | 1.2 | 1.2 | 1.2 | 2.5 |
| Cured adhesive sheet thickness (mm) | 3.5 | 1.9 | 2.9 | 2.4 | 4.3 | 3.4 | 3.1 | 2.5 |
| Bend strength (kg) | 62 | 41 | 68 | 53 | 76 | 39 | 57 | 69 |
| Deformation of steel plate | A | A-B | A | A | A | A-B | A-B | C |
| Shifting of adhesive sheet | A | A | A | A | A | A | B-C | A |
| Dynamic elastic modulus of cured resin (dyne/cm$^2$) | $4.1 \times 10^9$ | $9 \times 10^9$ | $6.8 \times 10^9$ | $5.3 \times 10^9$ | $2.4 \times 10^9$ | $3.7 \times 10^9$ | $4.3 \times 10^9$ | $38 \times 10^9$ |
| Linear expansion coefficient of cured resin (1/°C.) | $1.9 \times 10^{-5}$ | $2.2 \times 10^{-5}$ | $1.5 \times 10^{-5}$ | $2.1 \times 10^{-5}$ | $1.8 \times 10^{-5}$ | $4.1 \times 10^{-5}$ | $2.0 \times 10^{-5}$ | $3.1 \times 10^{-5}$ |
| Cutting property | A | A | A | A | A | A | C | C |
| Application Property | A | A | A | A | A | A | C | C |
| Blistering after heat cure | A | A | A | A | A | A | C | B |

DEFORMATION OF STEEL PLATE

Each of the adhesive sheets having a dimension of 50×100 mm was applied on the center of one side of a steel plate having a thickness of 0.8 mm and a dimension of 200×300 mm, and then heat-cured for 30 minutes in an atmosphere of 180° C.

During the heat cure, the steel plate was examined for deformation with the naked eye.

After the heat cure, the resulting laminate was cooled to room temperature, and then deformation of the steel plate was evaluated by visually examining the coating side of the steel plate.
A: no deformation
B: slight deformation was observed
C: deformation was observed.

The above-obtained laminates each consisting of adhesive sheet and steel plate were used as test pieces in the bend strength test described below.

BEND STRENGTH

A test piece was prepared by applying the adhesive sheet having a dimension of 50×150 mm on the center of one side of a steel plate having a thickness of 0.8 mm and a dimension of 70×200 mm. The test piece was horizontally supported on the top ends of two flat plates (50 mm wide) which had been perpendicularly mounted on a support table in such a manner that the flat plates were parallel to each other at a distance of 100 mm as measured at the top ends thereof, each of the two flat plates having an upside-down-U-shaped cross section with the radius of curvature at the top end being 5 mm. Subsequently, downward load was applied to the upper side of the center of the test piece by means of a perpendicular flat plate (50 mm wide) having a U-shaped cross section with the radius of curvature being 10 mm, and the maximum bending stress (kg/70 mm width) was measured.

SHIFTING OF APPLIED ADHESIVE SHEET

Each of the above-obtained reinforcing adhesive sheets (50 mm wide, 150 mm long) was applied on a steel plate having a thickness of 0.8 mm, a width of 70 mm, and a length of 250 mm. After the application, the resulting steel plate was heated for 30 minutes in an atmosphere of 180° C. while the plate was kept perpendicular, thereby to cure the adhesive sheet.

Thereafter, how long the reinforcing adhesive sheet had shifted during the heat cure was measured.
A: shift length 0-3 mm
B: shift length 3-10 mm
C: shift length 10 mm or more.

CUTTING PROPERTY

The above-obtained adhesive sheets were cut by means of a cutter, and fraying of the reinforcing substrates at the resulting edges was evaluated.
A: no fraying of reinforcing substrate
C: fraying of reinforcing substrate occurred.

APPLICATION PROPERTY

The above-obtained adhesive sheets having a width of 70 mm and a length of 300 mm were applied to adherends one-handed, and their application properties were evaluated.
A: one-handed application was possible
C: sheet was bent and one-handed application was impossible.

BLISTERING AFTER HEAT CURE

The above-obtained adhesive sheets having a width of 70 mm and a length of 300 mm were applied to steel plates, and then heat-cured for 30 minutes in an atmosphere of 180° C.

The heat-cured sheets of the resulting laminates were visually examined for blisters.
A: no blisters
B: blisters of 5 mm in diameter or smaller were observed
C: blisters larger than 5 mm in diameter were observed.

DYNAMIC ELASTIC MODULUS

The dynamic elastic moduli of the adhesive sheets were measured in accordance with ASTM D4065-82.

LINEAR EXPANSION COEFFICIENT

The linear expansion coefficients of the adhesive sheets were measured in accordance with ASTM D696-79.

It was ascertained as Table 2 shows that in the case where the thermosetting resin composition layers in the adhesive sheets according to the present invention contain a foaming agent and short fibers and a thixotropic agent, the adhesive sheets can show excellent reinforcing effects even if the amounts of the thermosetting resin compositions used are small and the thicknesses of the adhesive sheets are small in comparison to the conventional reinforcing sheets.

Even where the adhesive sheets of the present invention were applied to thin rigid plates and cured while the rigid plates were kept perpendicular, no shifting of the adhesive sheets was observed, showing good anti-shifting properties. With respect to deformation of thin metal plates, e.g., steel plates, after curing, it was ascertained that the adhesive sheets of the present invention are less apt to cause thin metal plate deformation because the resin layers in the cured adhesive sheets have reduced contraction stress, which is due to the low moduli of elasticity and expansion coefficients of the resins resulting from foaming of the resins and also to incorporation of short fibers.

It was further ascertained that due to the sizing treatment of the reinforcing substrates with a heat-resistant resin, the adhesive sheets of the present invention have good cutting properties, are free from fraying of the reinforcing substrates at cut edges of the adhesive sheets, and have good application properties because of their moderate stiffness, which enables one-handed application thereof. Moreover, due to such improved application properties, the cured adhesive sheets are free of blisters caused by air included between adhesive sheets and adherends at the time of the application of the adhesive sheets.

The adhesive sheet of the present invention for reinforcing thin rigid plates shows the following effects, which are brought about by its specific construction as described above.

The adhesive sheet for reinforcing thin rigid plates of the present invention has moderate stiffness and good cutting properties since the reinforcing substrate provided on the thermosetting resin composition layer has undergone sizing treatment with a heat-resistant resin. Due to such moderate stiffness, the adhesive sheet shows improved application properties in automobile-production lines or the like, and the blister problem caused by air included between adhesive sheets and adherends at the time of application thereof is overcome. Furthermore, because of the size-treated reinforcing substrate, fraying of the reinforcing substrate at the time of cutting of the adhesive sheet is prevented and the pollution of coatings by fibers released from frayed reinforcing substrates is also prevented.

The adhesive sheet for reinforcing thin rigid plates may preferably employ a thermosetting resin composition layer comprising a foaming agent, specific short fibers and a thixotropic agent. Due to such thermosetting resin composition layer, this adhesive sheet eliminates the necessity of two resin layers, such as the conventional first and second resin layers described hereinbefore, and as a result, both the amount of the resin used and the thickness of the resin layer can be reduced, and in addition, the heat-cured adhesive sheet has a small weight but high reinforcing effect due to heat-foaming of the resin. This heat-foaming of the resin also greatly decreases the thermal expansion coefficient and elasticity modulus of the resin layer, and this results in a significantly reduced thermal contraction stress. For this reason, the heat-cured adhesive sheet can produce a high reinforcing effect without causing the adherend thin metal plate, e.g., steel plate, to deform. Furthermore, due to the incorporation of the thixotropic agent, foaming of the resin results in uniform and fine foam cells and, even when the adhesive sheet is applied on a perpendicular part of an adherend or on the lower side of an adherend upside down and then cured, the adhesive sheet does never shift of fall. Thus, the adhesive sheet of this invention has improved application properties.

While the invention has been described in detail and with reference to specific embodiments thereof, it will be apparent to one skilled in the art that various changes and modifications can be made therein without departing from the spirit and scope thereof.

What is claimed is:

1. An adhesive sheet for reinforcing thin rigid plates consisting essentially of:
   (a) a thermosetting resin composition layer, tacky at room temperature, comprising a thermosetting resin, a hardener, and a foaming agent that decomposes to produce foam; and,
   (b) a reinforcing substrate laminated or embedded with said thermosetting resin composition layer, said reinforcing substrate being treated with a heat-resistant resin to increase stiffness and maintain the uniformity of the thermosetting resin layer following foaming, and wherein the amount of said heat-resistant resin is from 2 to 20% by weight based on the amount of the reinforcing substrate before treatment.

2. An adhesive for reinforcing thin rigid plates as claimed in claim 1, wherein said thermosetting resin composition layer further comprises short fibers and a thixotropic agent, and the amount of said short fibers is from 10 to 100 parts by weight of the resin component in said thermosetting resin composition.

3. An adhesive sheet for reinforcing thin rigid plates as claimed in claim 1, wherein said reinforcing substrate comprises glass cloth having a thickness of from about 5 to 500 μm.

4. An adhesive sheet for reinforcing thin rigid plates as claimed in claim 1, wherein said thermosetting resin is an epoxy resin or a modified epoxy resin.

5. An adhesive sheet for reinforcing thin rigid plates as claimed in claim 1, wherein said hardening agent is activated at a temperature of from 80° to 200° C., and the amount of the hardener is from 3 to 30 parts by weight per 100 parts by weight of the resin component in said thermo-setting resin composition.

6. An adhesive sheet for reinforcing thin rigid plates as claimed in claim 2, wherein said foaming agent has a decomposition temperature of 100° C. or more, and the amount of said foaming agent is from 0.5 to 10 parts by weight per 100 parts by weight of the resin component in said thermo-setting resin composition.

7. An adhesive sheet for reinforcing thin rigid plates as claimed in claim 2, wherein said short fibers have an aspect ratio of from 5 to 350 and a diameter of from 1 to 30 μm.

8. An adhesive sheet for reinforcing thin rigid plates as claimed in claim 2, wherein said thixotropic agent is organobentonite, and the amount of said thixotropic agent is from 3 to 30 parts by weight per 100 parts by weight of the resin component in said thermosetting resin composition.

9. An adhesive sheet for reinforcing thin rigid plates as claimed in claim 2, wherein said thin rigid plates are thin metal plates.

10. An adhesive sheet for reinforcing thin rigid plates as claimed in claim 2, wherein the modulus of elasticity of said adhesive sheet after heat cure is from $1 \times 10^8$ to $1 \times 10^{10}$ dyne/cm$^2$.

11. An adhesive sheet as claimed in claim 1, wherein the amount of the heat-resistant resin is from 4 to 10% by weight based on the amount of the reinforcing substrate before the sizing treatment.

12. An adhesive sheet as claimed in claim 1, wherein the heat-resistant resin is a curable resin.

13. An adhesive sheet as claimed in claim 4, wherein the heat-resistant resin is a cured product of a curable resin.

* * * * *